(12) United States Patent
Wu

(10) Patent No.: US 7,125,327 B2
(45) Date of Patent: Oct. 24, 2006

(54) SCRAPER FOR REFURBISHING WINDSCREEN WIPER BLADES

(75) Inventor: Chun-Kuan Wu, 4F-1, No. 138, Wucyuan W. 6h St., Taichung (TW)

(73) Assignees: Chun-Kuan Wu (TW); Yang Cherng Tool Ltd. (TW)

( * ) Notice: Subject to any disclaimer, the term of this patent is extended or adjusted under 35 U.S.C. 154(b) by 0 days.

(21) Appl. No.: 11/004,953

(22) Filed: Dec. 7, 2004

(65) Prior Publication Data
US 2005/0125929 A1   Jun. 16, 2005

(30) Foreign Application Priority Data
Dec. 10, 2003   (TW) .............................. 92134845 A

(51) Int. Cl.
*B24D 17/00* (2006.01)
(52) U.S. Cl. ....................................... 451/490; 451/523
(58) Field of Classification Search ................ 451/490, 451/523–525, 458, 514–520
See application file for complete search history.

(56) References Cited

U.S. PATENT DOCUMENTS

| | | | | |
|---|---|---|---|---|
| 3,670,459 A | * | 6/1972 | Welton | 451/461 |
| 4,617,765 A | * | 10/1986 | Weiler | 451/558 |
| 5,426,895 A | * | 6/1995 | Siciliano et al. | 451/523 |
| 5,782,681 A | * | 7/1998 | Bresnahan | 451/523 |
| 6,322,266 B1 | * | 11/2001 | Traynor | 401/6 |
| 2001/0034919 A1 | * | 11/2001 | Faggiotto | 15/236.06 |

* cited by examiner

*Primary Examiner*—Dung Van Nguyen
(74) *Attorney, Agent, or Firm*—Hershkovitz & Associates; Abe Hershkovitz

(57) ABSTRACT

A scraper for refurbishing windscreen wiper blades has a frame with an outer periphery, at least one trimming groove defined in the outer periphery of the frame, and at least one scrubbing material respectively received inside the at least one trimming groove. The trimming groove receives a deteriorated rubber blade inside and slides to scrape surfaces of the rubber blade until the rubber blade becomes refurbished. Thereby, the rubber blade is trimmed conveniently and easily without excessive material loss.

5 Claims, 5 Drawing Sheets

SCRAPER FOR REFURBISHING WINDSCREEN WIPER BLADES

BACKGROUND OF THE INVENTION

1. Field of the Invention

The present invention relates to a scraper, and more particularly to a scraper for refurbishing windscreen wiper blades, which efficiently and conveniently trims the windscreen wiper blades by scrubbing.

2. Description of Related Art

A windscreen wiper has at least one blade made of rubber or the like to attach to a screen to remove water, grime or water stain to keep the screen clean. However, because the rubber blade easily deteriorates under sunshine or is stained with stubborn dirt after a period of time, the rubber blade has to be replaced with a new one frequently. This replacement involves finding a store that stocks the particular model of wiper blade, paying for it, and removing the old blade to replace it with the new one. Furthermore, the purchaser may have to incur further expense in paying for fitting the blade as some people are not practical enough to do it themselves. Such a seemingly simple task may in fact become a burden for a busy person, thus leading to a delay in doing it whereby the improperly cleaned windscreen becomes a safety hazard. Therefore, if the rubber blade can be refurbished, the vehicle owner can save time, effort and money in by not buying new rubber blades.

A conventional repairing machine for the rubber blade has sharp knives to shave off aged surfaces or stained surfaces of the rubber blades. However, too much of the rubber blade is removed in each shaving so that the rubber blade is consumed quickly and has a short life-span when the rubber is refurbished with the conventional repairing machine.

The present invention has arisen to mitigate or obviate the disadvantage of the conventional refurbishing machine for the rubber blades on the windscreen wipers.

SUMMARY OF THE INVENTION

The main objective of the present invention is to provide a scraper that conveniently and easily removes deteriorated or stained surfaces of a rubber windscreen wiper blade.

To achieve the foregoing main objective, the scraper in accordance with the present invention comprises a frame with an outer periphery, at least one trimming groove defined in the outer periphery of the frame, and at least one scrubbing material respectively received inside the at least one trimming groove.

The frame is preferably composed of multiple sidewalls and multiple bridges respectively connected between two adjacent sidewalls.

Each trimming groove is defined by the two adjacent sidewalls and a corresponding bridge and has a bottom and at least one convex portion.

Each scrubbing material is attached on the bottom of the corresponding trimming groove.

The trimming groove receives a rubber blade inside and slides to scrape surfaces of the rubber blade until the rubber blade becomes as good as new. Thereby, the rubber blade is trimmed without removing excessive amounts of material.

Further benefits and advantages of the present invention will become apparent after a careful reading of the detailed description with appropriate references to the accompanying drawings.

DETAILED DESCRIPTION OF THE PREFERRED EMBODIMENT

A scraper for refurbishing a windscreen wiper blade in accordance with the present invention comprises a frame with an outer periphery, at least one trimming groove defined in the outer periphery of the frame, and at least one scrubbing material respectively received inside the at least one trimming groove.

Figure 1:
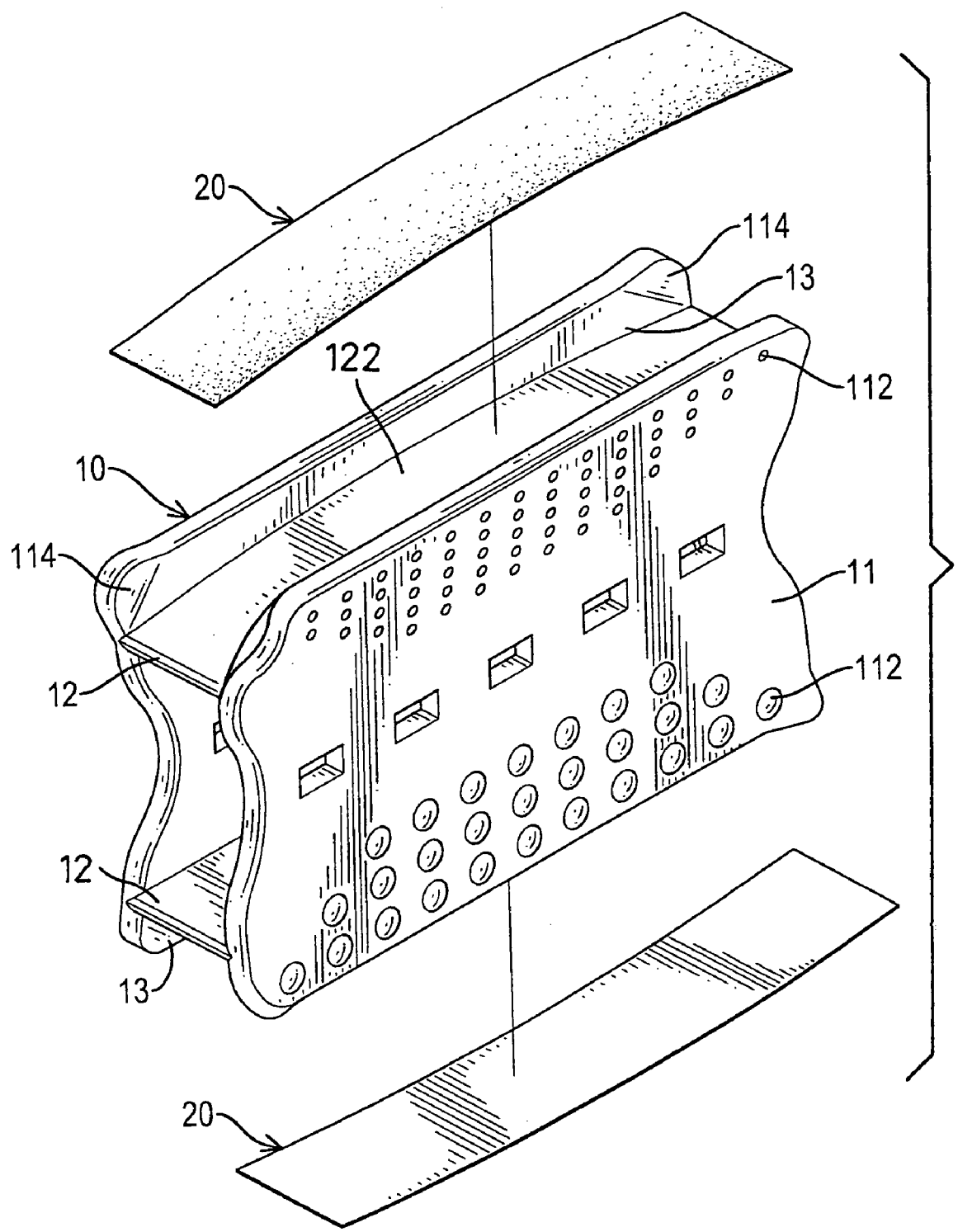
FIG. 1 is an exploded perspective view of a scraper for refurbishing a windscreen wiper blade in accordance with the present invention.
Figure 2:
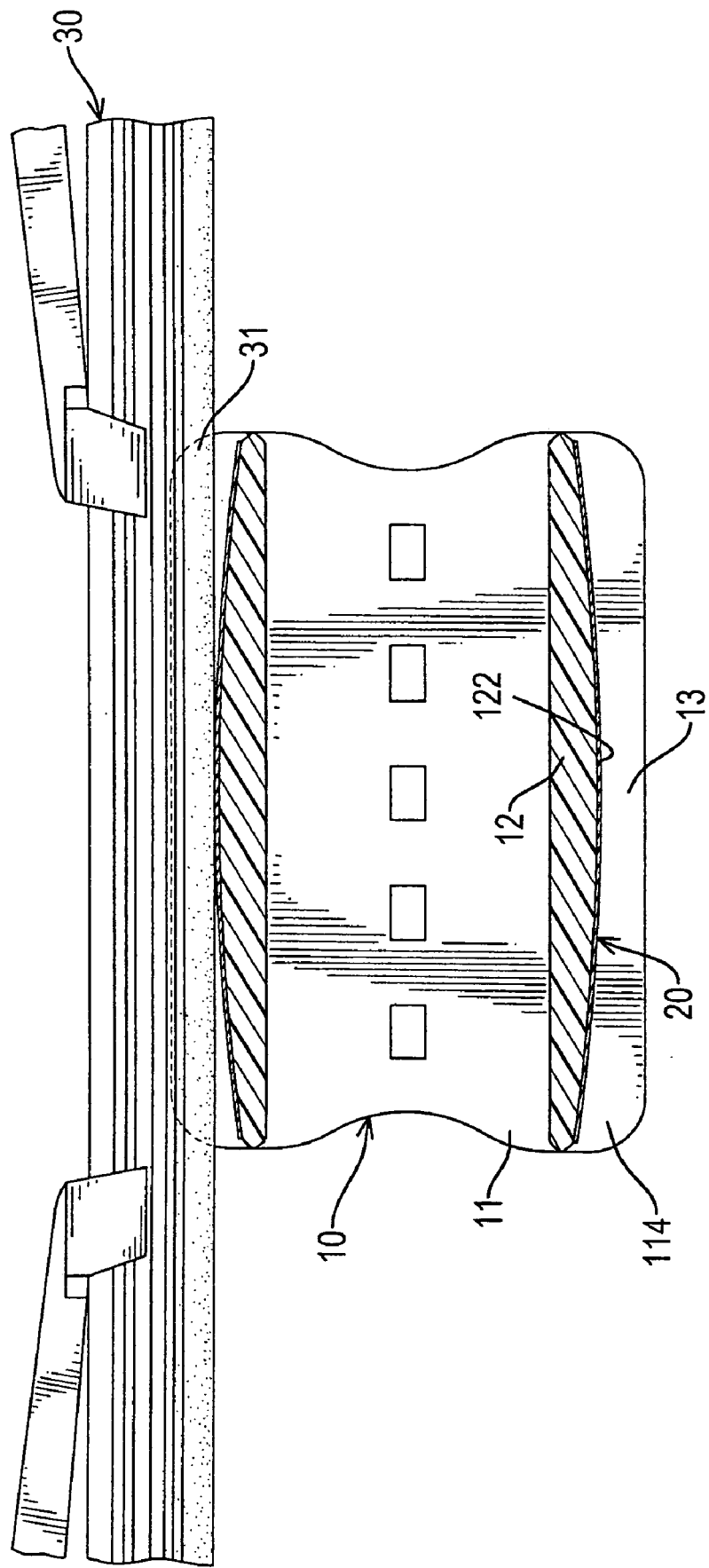
FIG. 2 is a cross-sectional side view of the scraper in FIG. 1, wherein the scraper is attached to a windscreen wiper.
Figure 4:
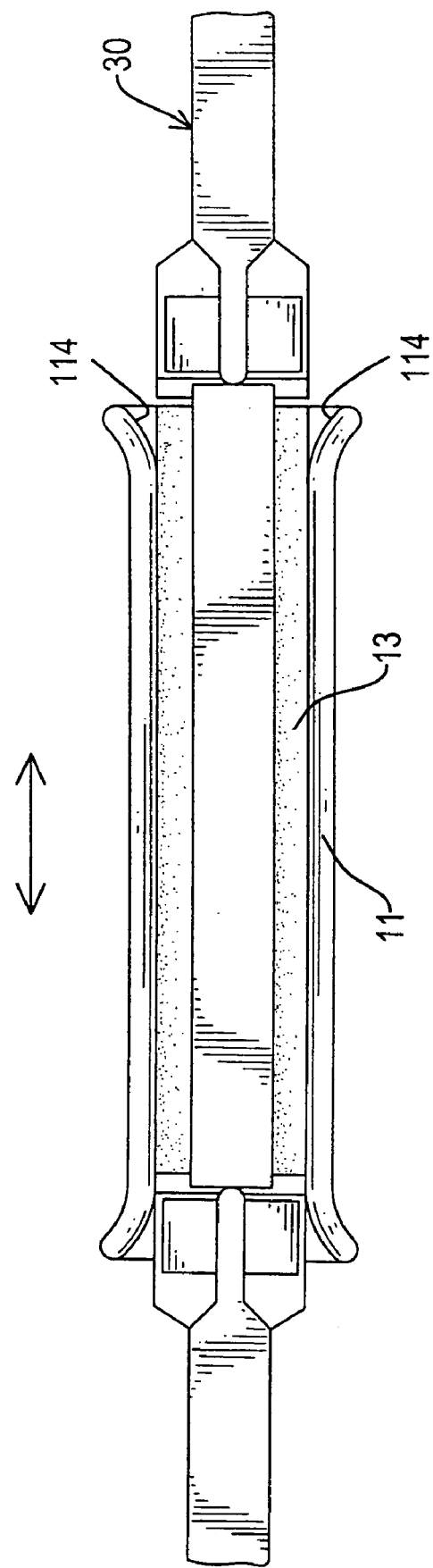
FIG. 4 is another operational top view showing the movements of the scraper in FIG. 2.

With reference to FIGS. 1, 2 and 4, a preferred embodiment of the scraper has a parallelepiped frame (10), two trimming grooves (13), two strips of scrubbing paper (20), and optional multiple bosses (112).

The parallelepiped frame (10) is composed of two sidewalls (11) and two bridges (12). Each sidewall (11) has a top end, a bottom end, an inner face and an outer face and erects parallel with the other sidewall (11). The two bridges (12) are respectively connected between the two sidewalls (11) near the top end and the bottom end. Each trimming groove (13) is defined by the two sidewalls (11) and the bridge (12) at the top end or the bottom end. Preferably, each bridge (12) has a convex middle portion (122) to enhance the scraping efficiency of the scraper when the scraper abuts a rubber blade (31).

Optionally, each sidewall (11) further has four guiding arcs (114) at respective corners to lead in the rubber blade (31) to enter the trimming groove (13) easily. The multiple bosses (112) are formed on the outer surfaces of the two sidewalls (11) to enable the scraper to be held easily.

The two strips of scrubbing paper (20) serving as the scrubbing materials are respectively attached to the two bridges (12) and inside the trimming grooves (13). Each strip of the scrubbing paper (20) has a rough face with multiple grains made of aluminum oxide or silica. Each strip has grains of a particular size that is different to another grain size of the other strip to achieve different roughness and different scrubbing effects. Correspondingly, the multiple bosses (112) formed on the outer faces of the sidewalls (11) are of a particular diameters to correspondingly define roughness of strips of the abrasive paper (20).

Figure 3:
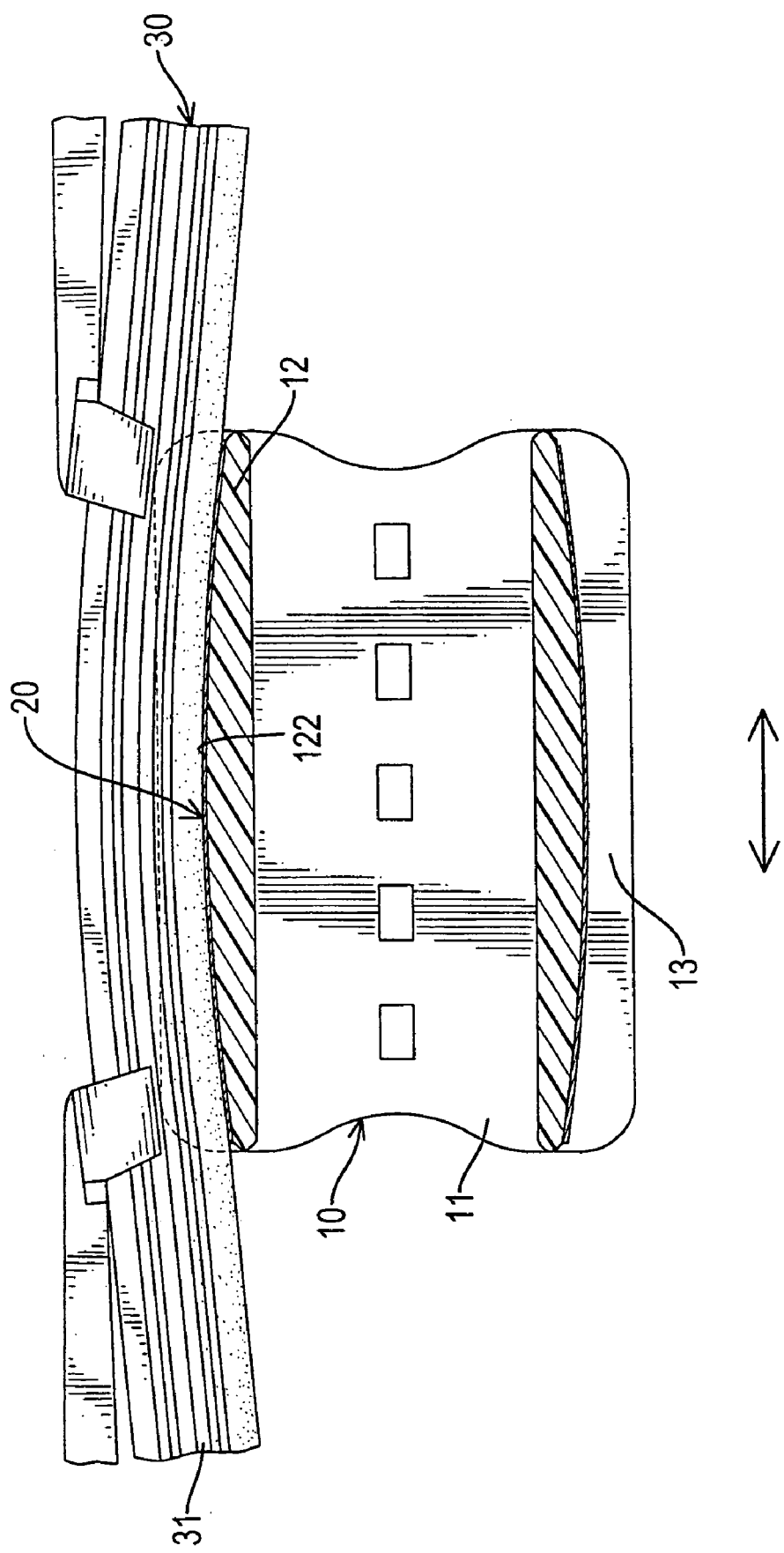
FIG. 3 is an operational cross-sectional side view showing movements of the scraper in FIG. 2.

With reference to FIGS. 3 and 4, when the scraper operates, the rubber blade (31) on a windscreen wiper (30) is squeezed and received inside one trimming groove (13) with a desired roughness until the scrubbing material abuts surfaces of the rubber blade (31). Then, the scraper slides over the rubber blade (31) to remove the deteriorated surfaces until new clean surfaces are exposed. By scrubbing, only small portions of the deteriorated surfaces are removed from the rubber blade (31) so that the rubber blade (31) is not excessively depleted, unlike as experienced with the conventional repairing machine. Therefore, the rubber blade

(31) has an extended lifespan. Moreover, because the structure of the scraper is simple, manufacturing cost of the scraper is relatively low in comparison with the conventional repairing machine having the sharp knives.

Figure 5:
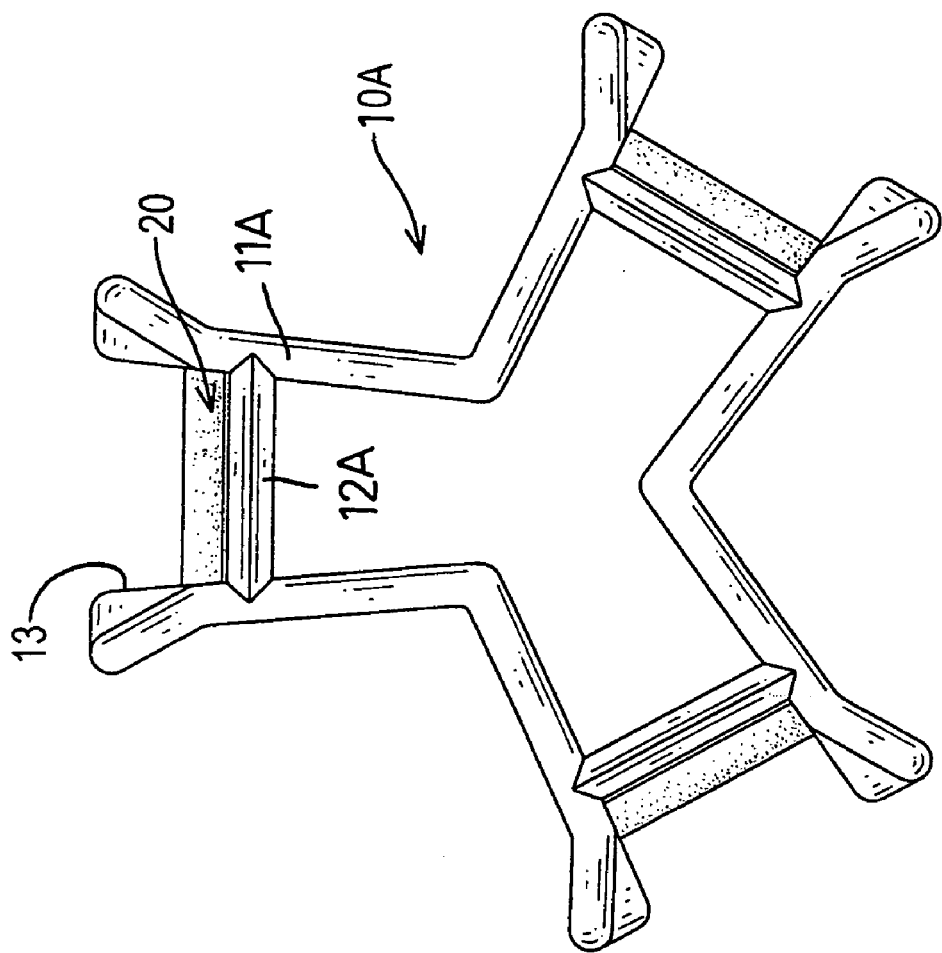
FIG. 5 is a cross-sectional front view of another embodiment of the scraper in accordance with the present invention.

With reference to FIG. 5, another preferred embodiment of the scraper in accordance with the present invention has been modified in the structure of the frame (10A). The frame (10A) is triple branched and is composed of three angled sidewalls (11A) with distal ends and three bridges (12A) individually connecting between two distal ends of two adjacent angled sidewalls (11A). Therefore, three trimming grooves (13A) are defined on the triple branched frame (10A) to make more options in the roughness of the scrubbing papers (20).

According to the above description, the scraper as described has several advantages as the following:

1. Structures of the scrapers in the present invention are simple, therefore, the scrapers have low manufacturing costs and competitive advantages in price.

2. The scraper only removes small parts of the deteriorated surfaces of the rubber blade. The refurbished rubber blade has a long lifespan.

3. The additional convex middle portion on the bridge makes the trimming of the rubber blade efficient.

4. The arrangement of the bosses in different sizes marks the roughness of the scrubbing material to enable the user to select conveniently the appropriate scrubbing paper.

5. The guiding arcs at ends of the trimming grooves allow the rubber blade to be received and slid inside the trimming grooves fluently.

Although the invention has been explained in relation to its preferred embodiments, many other possible modifications and variations can be made without departing from the spirit and scope of the invention as hereinafter claimed.

What is claimed is:

1. A scraper for refurbishing windscreen wiper blades comprising:

a frame with an outer periphery;

at least one trimming groove defined in the outer periphery of the frame, wherein each one the at least one trimming groove has a bottom face provided with a convex middle portion;

at least one scrubbing material respectively received inside the at least one trimming groove;

the frame being parallelepiped-shaped and having:

two sidewalls parallel with each other, each sidewall having a top end, a bottom end, an inner face, an outer face, and four corners;

two bridges respectively connected between the two sidewalls near the top end and the bottom end, wherein two trimming grooves are defined by the two sidewalls and the bridge at the top end and the bottom end of the two sidewalls; and two strips of scrubbing paper serving as the scrubbing materials are respectively attached to the two bridges inside the trimming grooves;

each strip of the scrubbing paper has having a rough face of a particular roughness different to the roughness of the rough face of the other strip of scrubbing paper.

2. The scraper as claimed in claim 1, wherein the frame further has multiple bosses formed on the outer faces of the two sidewalls.

3. The scraper as claimed in claim 2, wherein the multiple bosses are arranged in groups of different diameters to correspondingly distinguish the roughness of strips of scrubbing paper.

4. The scraper as claimed in claim 3, wherein the each sidewall has four guiding arcs respectively formed at the four corners.

5. The scraper as claimed in claim 1, wherein each bridge has a convex middle portion.

* * * * *